UNITED STATES PATENT OFFICE.

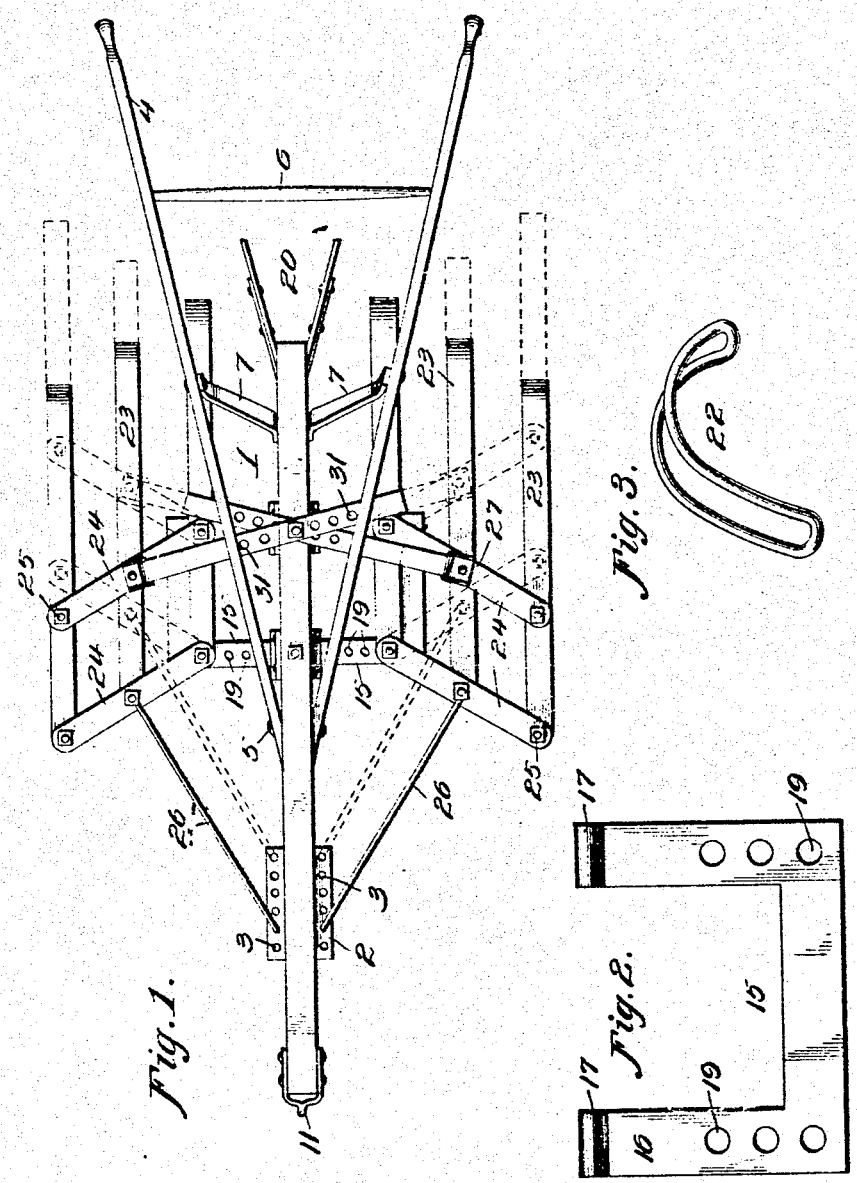

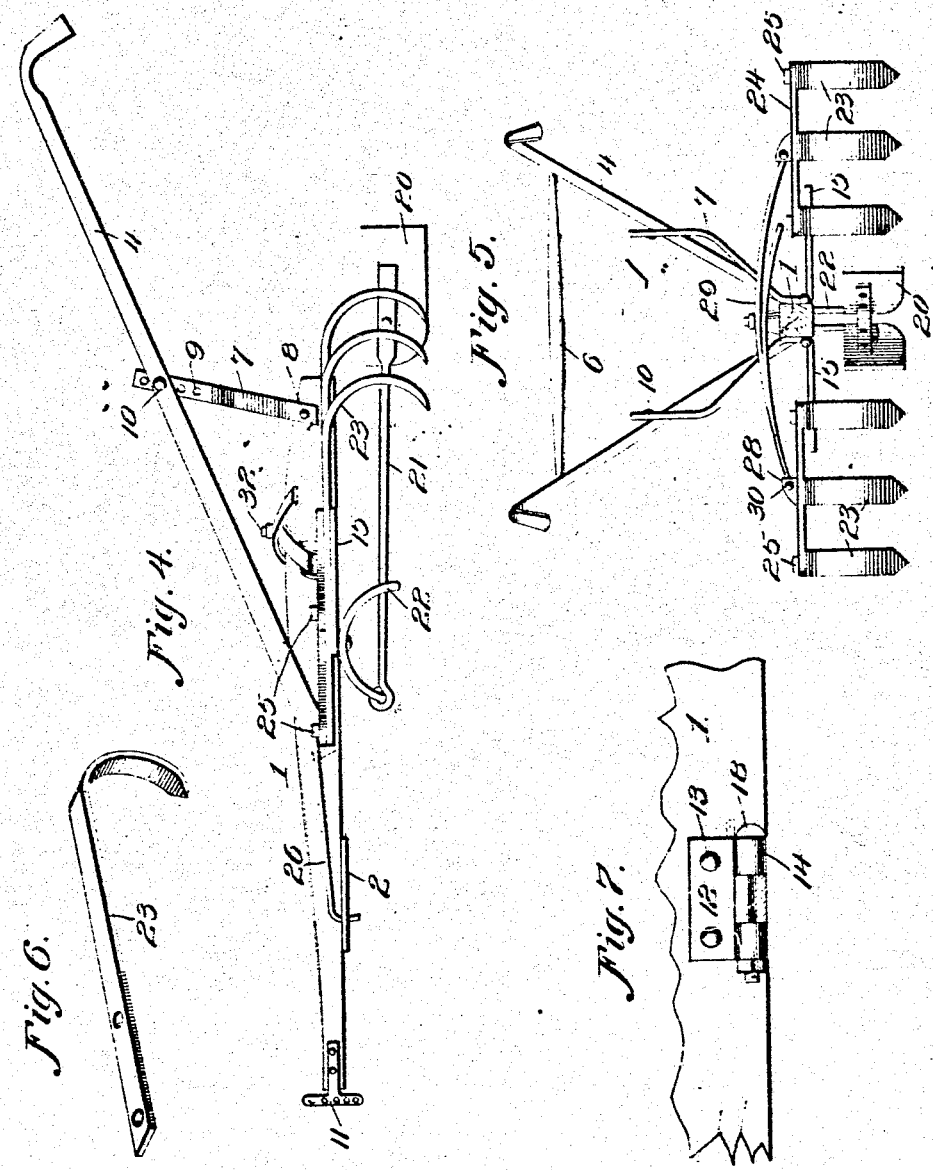

EDWIN M. McKISSICK, OF COLUMBUS, MISSISSIPPI.

ADJUSTABLE CULTIVATOR.

968,388.  Specification of Letters Patent.  Patented Aug. 23, 1910.

Application filed February 19, 1909.  Serial No. 478.836.

*To all whom it may concern:*

Be it known that I, EDWIN M. McKISSICK, a citizen of the United States, residing at Columbus, in the county of Lowndes and State of Mississippi, have invented new and useful Improvements in Adjustable Cultivators, of which the following is a specification.

This invention is an improved adjustable cultivator adapted for use in cultivating crops whether the same be growing in level beds, on ridges or in hollows between the ridges and the said invention consists in the construction, combination and arrangement of devices hereinafter described and claimed.

In the accompanying drawings:—Figure 1 is a plan of a cultivator constructed in accordance with my invention. Fig. 2 is a detail plan of one of the hinge frames to which the cultivator devices are connected. Fig. 3 is a detail perspective view of the guiding link to which the fender is connected. Fig. 4 is a side elevation of my improved cultivator. Fig. 5 is a rear elevation of the same. Fig. 6 is a detail perspective view of one of the cultivator devices. Fig. 7 is a detail view of a portion of the main beam, showing one of the hinge connections between the same and the hinge frames which carry the cultivator devices.

The main beam 1 of my improved adjustable cultivator is provided on its under side at a suitable distance from its front end with a plate 2 of suitable length which plate projects beyond opposite sides of the beam and is provided with adjusting openings 3. A pair of handle bars 4 are secured at their front ends as by a bolt 5 to opposite sides of the beam at a distance from the front end of the latter. Said handle bars are connected together near their rear ends by a rung 6. A pair of brace bars 7 have their lower ends pivotally connected to the beam by a bolt 8. They are provided at their upper ends with adjusting openings 9 and bolts 10 are employed which in coaction with said adjusting openings secure the handle bars to the said brace bars at any desired adjustment of the handle bars so that the latter may be raised or lowered as desired. A clevis 11 is secured to the front end of the beam. At suitable distances from the rear end of the beam are hinge plates 12 which are secured by bolts 13 and are provided at their lower ends with hinge members 14. Hinge frames 15 which are preferably of the form shown in Fig. 2 are provided at the inner ends of the arms 16 with hinge members 17 which fit between the hinge members 14 of the plates 12. Pintle bolts 18 are fitted in alining openings in the hinged members of the hinge plates and hinge frames and serve to pivotally connect the latter to the beam so that said hinge frames may be disposed either in a horizontal position or in any desired inclination above or below a horizontal plane. The said hinge frames are provided with adjusted openings 19. A pair of fender plates 20 which are disposed angularly with reference to each other and converge toward their front ends are secured to the rear end of and in the fork of a draft rod 21, the front end of which is pivotally connected to the front end of a link 22. The said link is semi-circular in form, is secured to the under side of the beam 1 at a point between the front pair of hinge plates 12 and the said draft rod 21 operates between the sides of the said link so that the latter not only serves to connect the fender draft rod to the beam 1 but also serves to guide said draft rod and enable it to be moved in a vertical plane.

In connection with the frame of the cultivator which comprises the beam 1, the handles and the hinge frames 15, I provide two series of cultivator devices, which are here shown as spring teeth 23, each series of which is connected at and near the front ends by cross bars 24, the said cross bars being pivotally connected to the said cultivator devices by bolts 25. Certain of the said bolts 25 also coöperate with certain adjusting openings 19 of the hinge frames 15 to connect the gangs of cultivator devices to the said hinge frames at any desired distance from the beam 1. Each gang of cultivator devices is connected by a rod 26 to the plate 2, the front ends of said rods being downturned and engaged with certain openings 3 in said plate so that the cultivator devices 23 may be set at any desired distance apart and may be adjusted either forwardly or rearwardly as indicated in full and dotted lines in Fig. 1.

Each cultivator gang is provided with a plate 27 connected pivotally thereto by one of the bolts 24 and provided with hinge members 28. Adjusting bars 29 have their outer ends pivotally connected to the said plates 27 by pivot pins 30. Said adjusting bars are provided with adjusting openings 31 and are connected to the beam 1 by a bolt 32, the said bolt being engaged with said openings 31 of said adjusting bars so that the latter may be caused to secure the frames 15 and the gangs of cultivator devices either in a horizontal position on opposite sides of the beam 1 as shown in Fig. 5 or in an inclined position at any angle according to whether the cultivator is to be used for cultivating a crop planted on the level or cultivating a crop planted on a ridge or listed between the ridges.

Cultivating shovels or points of any suitable or desired construction may be attached to the downturned standard rear end portions of the cultivator devices or teeth 23 for operation in the soil between the rows of plants as will be understood. The fender plates run on opposite sides of the row of plants and prevent clods, stones and the like from injuring the plants. If the use of the fender plates is not desired they may be readily raised as will be understood.

What is claimed is:—

1. In a cultivator, the combination of a beam, a frame connected thereto for movement in a vertical plane and extending laterally from one side thereof, a gang of cultivator devices, cross bars connecting said cultivator devices together and pivotally connected thereto, one of said cultivator devices being connected to and laterally adjustable on said pivotally connected frame, means to secure said pivotally connected frame and gang of cultivator devices in an adjusted position in a vertical plane and means to secure said cultivator devices in an adjusted position laterally with respect to one another.

2. A cultivator comprising a centrally disposed beam, frames on opposite sides thereof extending laterally therefrom and hinged thereto for angular movement in a vertical plane, gangs of cultivator devices, each gang having cross bars connecting the individual devices thereof together and pivotally connected thereto, one of said cultivator devices of each gang being connected to and laterally adjustable on one of said hinged frames, means to secure said pivotally connected frames and gangs of the cultivator devices in an adjusted position in a vertical plane and means to secure said cultivator devices in an adjusted position laterally with respect to one another.

In testimony whereof I affix my signature in presence of two witnesses.

EDWIN M. McKISSICK.

Witnesses:
T. W. HARRIS,
WM. WINSTON.